United States Patent
Chickering et al.

(10) Patent No.: US 8,369,224 B1
(45) Date of Patent: Feb. 5, 2013

(54) COMBINING NETWORK ENDPOINT POLICY RESULTS

(75) Inventors: Roger Chickering, Granite Bay, CA (US); Stephen R. Hanna, Bedford, MA (US); Paul Funk, Cambridge, MA (US); Panagiotis Kouriouris, Cupertino, CA (US); Paul James Kirner, Jamaica Plain, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1268 days.

(21) Appl. No.: 11/530,189

(22) Filed: Sep. 8, 2006

(51) Int. Cl.
*H04J 1/16* (2006.01)
*H04J 3/14* (2006.01)
*H04L 1/00* (2006.01)
*H04L 12/26* (2006.01)

(52) U.S. Cl. ......... 370/241; 370/242; 370/245; 370/250

(58) Field of Classification Search ................ 726/6, 24, 726/25, 2; 370/229, 230, 241, 242, 245, 370/250
See application file for complete search history.

(56) References Cited

U.S. PATENT DOCUMENTS

| | | | |
|---|---|---|---|
| 7,533,407 B2 * | 5/2009 | Lewis et al. ........................ 726/6 |
| 2001/0023421 A1 * | 9/2001 | Numao et al. ..................... 707/9 |
| 2003/0004689 A1 * | 1/2003 | Gupta et al. ................... 702/188 |
| 2005/0063400 A1 * | 3/2005 | Lum .............................. 370/401 |
| 2005/0131997 A1 * | 6/2005 | Lewis et al. ................... 709/203 |

OTHER PUBLICATIONS

"TCG Trusted Network Connect TNC Architecture for Interoperability", Specification Version 1.0, Revision 4, May 3, 2005 Published, 39 pages.

\* cited by examiner

*Primary Examiner* — Kwang B Yao
*Assistant Examiner* — Adam Duda
(74) *Attorney, Agent, or Firm* — Harrity & Harrity, LLP

(57) ABSTRACT

An endpoint integrity system controls access to resources of a protected network for endpoint devices attempting to access the protected network. The system may include a number of evaluation modules that communicate with an endpoint device. The evaluation modules generate policy results for the endpoint device, in which each of the policy results assume one of three or more states, called a multi-state policy result. The multi-state policy results are combined to produce a combined Boolean policy result.

27 Claims, 6 Drawing Sheets

COMBINING NETWORK ENDPOINT POLICY RESULTS

BACKGROUND

1. Field of the Invention

Concepts described herein relate generally to network access, and more particularly, to network access control systems.

2. Description of Related Art

Organizations are continuously looking to prevent security threats from compromising their internal networks and endpoints (e.g., devices connected to the networks). When endpoints connect to an internal network, such as a proprietary corporate network, it is often desirable for the internal network to perform security checks of the connecting endpoints before granting the endpoint access to the internal network. The security checks may include checks relating to proof of identity of the user using the endpoint, proof of identity of the endpoint itself, and checks relating to the integrity status of the endpoint. The system that performs the security check and selectively grants access to endpoints will be referred to as an endpoint integrity system herein.

The endpoint integrity system may check proof of identity of the user on an endpoint using, for example, password based checks. An integrity status check may include determining the relative purity of the endpoint from software, hardware, and configurations that are considered harmful to the endpoint itself and to other devices with which it interacts. Examples of harmful software that may be inadvertently downloaded onto an endpoint include computer viruses or Trojans.

An endpoint integrity system may use evaluation modules to assist in the various proof of identity and integrity status checks. Each evaluation module may check a different aspect relating to the identity or integrity status of the endpoint. The results of the evaluation modules are then combined into an overall result for an endpoint.

In existing systems, evaluation modules may return a multi-state result that defines the output of the evaluation module. For example, each evaluation module may return an indication that the result of the security policy implemented by the evaluation module is "allow", "no access", "isolate", or "no recommendation". The results of the evaluation modules may then be combined to determine an overall result for the endpoint.

SUMMARY

In one aspect, a network device includes evaluation modules configured to communicate with an endpoint device, the evaluation modules configured to generate policy results for the endpoint device, each of the policy results being configured to assume one of three or more states. Further, a result combination component combines the generated policy results from the plurality of evaluation modules to produce a combined Boolean policy result.

In another aspect, a method includes receiving a request, from an endpoint, to initiate a connection. The method further includes interacting with the endpoint to obtain policy results relating to a security state of the endpoint, each of the policy results assuming one of three or more possible states. Further, the method includes combining the policy results to obtain a Boolean policy result based on a criterion defined by an expression in which the set of possible operands for the expression includes each of the possible states of the plurality of policy results.

In yet another aspect, a system includes gateway logic to control access between an endpoint and a protected network and logic to interact with the endpoint to obtain policy results relating to a security state of the endpoint, each of the policy results assuming one of three or more possible states. The system further includes logic to combine the plurality of policy results to obtain a Boolean policy result and logic to control access to resources of the protected network for the endpoint based on the Boolean policy result.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, an endpoint integrity system may use evaluation modules to check whether individual security policies are met by an endpoint. The results returned by the evaluation modules may be capable of taking three or more states. The endpoint integrity system combines the security policy results to a Boolean result (e.g., pass/fail) which may be used to enforce a higher level security policy.

Exemplary System Overview

Figure 1:
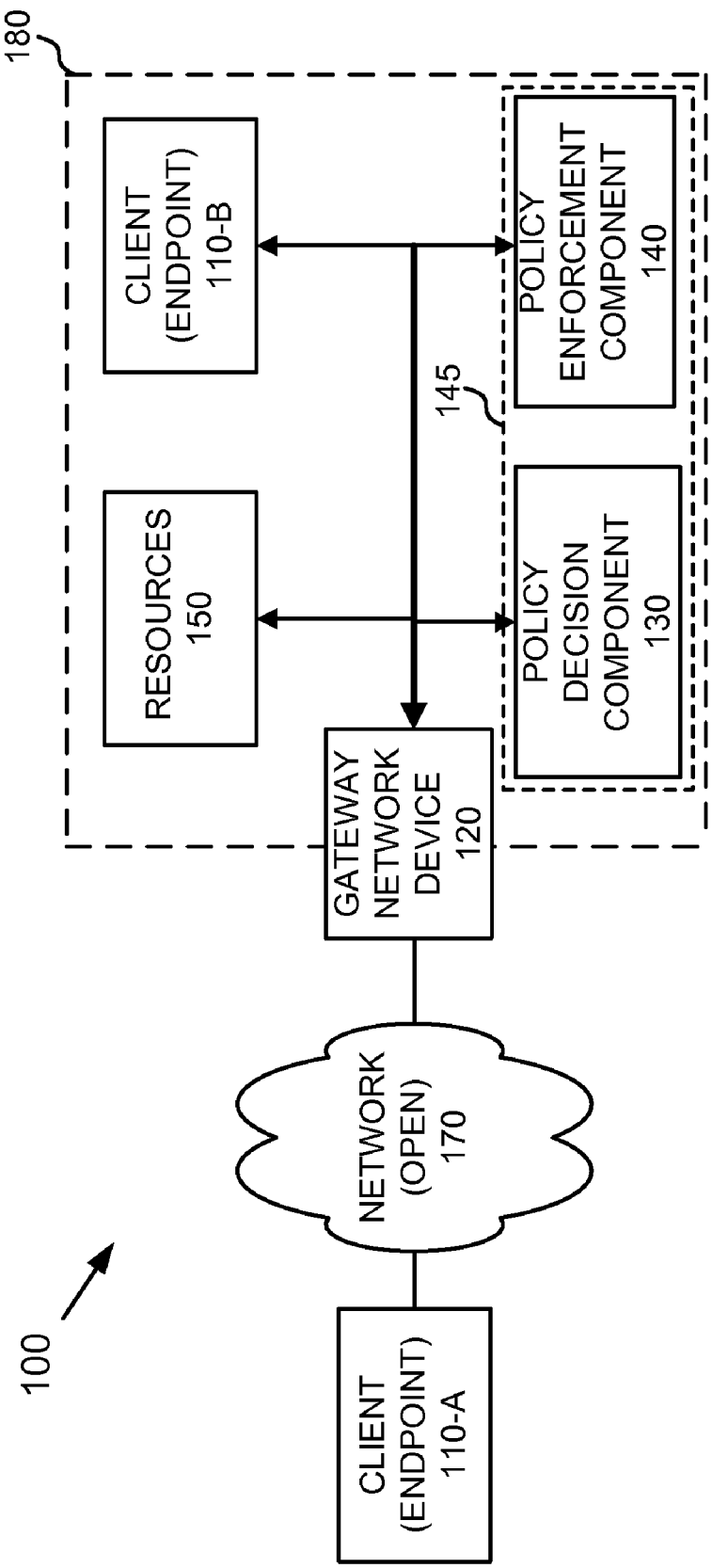
FIG. 1 is a diagram of an exemplary system.

FIG. 1 is a diagram of an exemplary system 100. System 100 may include an open network 170 and a protected network 180, such as a proprietary corporate network. Client devices 110-A and 110-B, also called endpoints herein, may connect to and access resources 150 in protected network 180. Protected network 180 may include one or more components designed to provide for the enforcement of security and/or access related policies. As shown in FIG. 1, these components include a gateway network device 120, a policy decision component 130, and a policy enforcement component 140. Policy decision component 130 and policy enforcement component 140, in particular, may together be associated with an endpoint integrity system 145.

Protected network 180 may include a number of resources 150, such as corporate web servers, that clients on the network may access. The resources may include, for example, resources relating to email applications, corporate files or databases, network access, and computing resources such as various corporate applications. In some implementations, it may be desirable to enforce access restrictions for various ones of resources 150. For example, only certain users may be permitted to access certain resources.

Gateway network device 120 may serve as a gateway to open network 170. Gateway network device 120 may generally control access with open network 170 and may include a firewall. Open network 170 may include a wide area network (WAN), a telephone network, such as the Public Switched Telephone Network (PSTN), or a combination of networks. Open network 170 may include the Internet. Open network 170 may also be a wireless network or a wired network accessible from open areas of a corporate office. Open network 170 may also be a network which users attach their endpoints directly to, while protected network 180 contains resources which administrators want to protect.

Endpoint 110-A may connect to protected network 180 over open network 170 and through gateway network device 120. Endpoint 110-B, in contrast, may reside within and connect directly to protected network 180. In either case, endpoint integrity system 145 may operate to control access to resources 150 by endpoints 110-A and 110-B. For example, protected network 180 may include equipment such as 802.1x enabled switches which force all endpoints attaching to protected network 180 to request access from the endpoint integrity system 145 before being allowed access to the network.

Policy decision component 130 may generally operate to make policy decisions relating to the access of resources 150 by endpoints 110-A and 110-B. Policy decisions made by policy decision component 130 may be enforced by policy enforcement component 140. Policy enforcement component 140 may, for example, control various resources 150 to be available or unavailable to an endpoint based on the policy decisions corresponding to the endpoint.

Two endpoints 110-A and 110-B, and a single gateway network device 120, policy decision component 130, and policy enforcement component 140 have been illustrated in FIG. 1 for simplicity. In practice, there may be more endpoints 110, gateway network devices 120, policy decision components 130, and policy enforcement components 140. Also, the functions performed by gateway network device 120, policy decision component 130, and policy enforcement component 140, may, in some implementations, be combined and implemented on one or two hardware devices. Further, in some implementations, certain ones of the devices shown in FIG. 1, such as gateway network device, may not be present or may nor participate in the techniques described herein.

Exemplary Device Architecture

Figure 2:
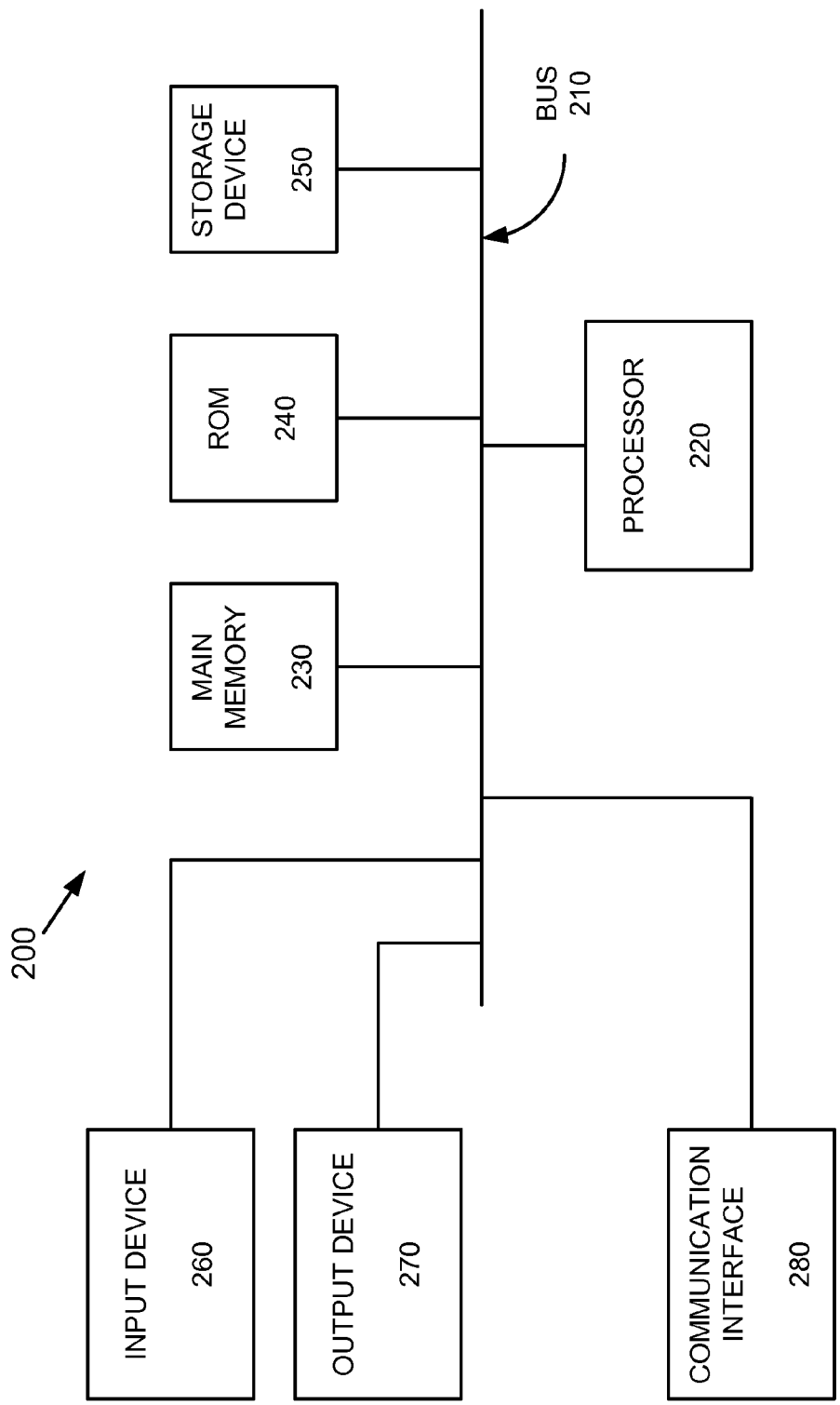
FIG. 2 is an exemplary block diagram of a device that may correspond to one of the devices shown in FIG. 1.

FIG. 2 is a block diagram of an exemplary device 200, which may correspond to an endpoint 110-A or 110-B, network device 120, policy decision component 130, policy enforcement component 140, or gateway network device 120. Device 200 includes a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

Device 200 may perform certain operations, as described in detail below. The device may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software. Additionally, although only a single element 220, 230, 240, 250, 260, 270, and 280 are shown in FIG. 2, one of ordinary skill in the art will recognize that device 200 could include more than one of any of these elements, such as multiple processors 220 or multiple communication interfaces 280.

Evaluation Modules

An endpoint 110 may include a number of evaluation modules that each perform a function, such as a security related function, at the endpoint. Policy decision component 130 may include a number of corresponding modules that communicate with the endpoint modules and each generate a policy result. The policy result may be a result capable of taking on three or more states, such as a tri-state result (e.g., pass/fail/isolate).

Figure 3:
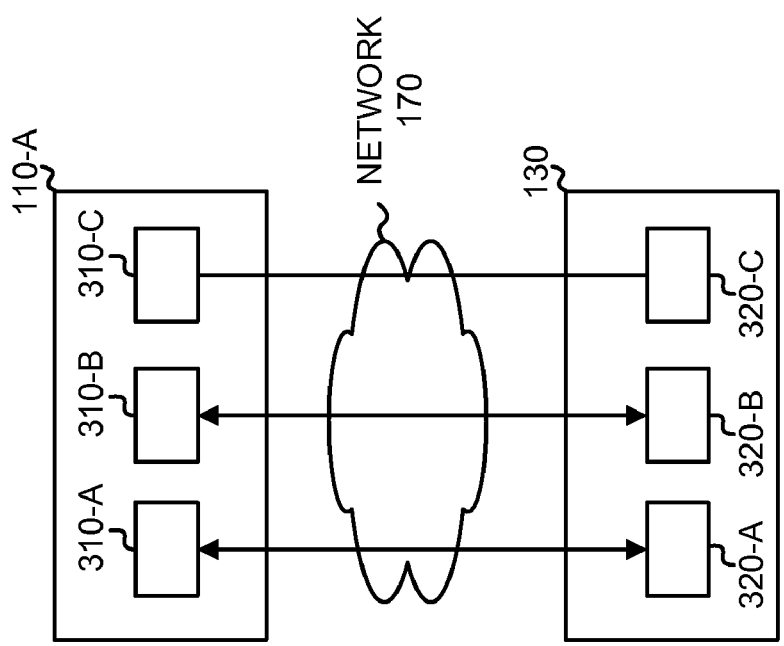
FIG. 3 is a diagram conceptually illustrating exemplary interaction of an endpoint and a policy decision component in determining policy results for the endpoint.

FIG. 3 is a diagram conceptually illustrating the interaction of an endpoint and a policy decision component in determining policy results for the endpoint. In this example, endpoint 110-A and policy decision component 130 are illustrated as communicating over open network 170. In other possible implementations, endpoint 110-A and policy decision component 130, instead of communicating over open network 170, may both communicate from within protected network 180. Endpoint 110-A includes three evaluation modules 310-A, 310-B, and 310-C. Policy decision component 130 includes three corresponding "server-side" evaluation modules 320-A, 320-B, and 320-C. Although three evaluation modules are shown at each of endpoint 110 and policy decision component 130, more generally, endpoints and policy decision component 130 may include an arbitrary number of evaluation modules.

Each of evaluation modules 310 may be preinstalled on endpoint 110-A and may perform a security function at endpoint 110-A. For example, evaluation module 310-A may check endpoint 110-A to determine whether an approved firewall is active at the endpoint, evaluation module 310-B may determine whether antivirus software is installed, and evaluation module 310-C and may determine whether anti-spyware software is installed.

Modules 320-A, 320-B, and 320-C may correspond to modules 310-A, 310-B, and 310-C, respectively, at endpoint 110-A. In other words, modules 310-A and 320-A may be designed to communicate with one another in order to exchange or determine the appropriate policy information (e.g., the appropriate policy information relating to whether an approved firewall is active at endpoint 110-A). Modules 310-B and 320-B, and 310-C and 320-C may be similarly designed to work in conjunction with one another.

One known standard for implementing corresponding evaluation modules at various endpoints and servers (e.g., policy decision component 130) is the TCG Trusted Network Connect architecture, distributed by the Trusted Computing Group. Evaluation modules conforming to this standard output a security policy result that may take one of four states, known as the allow, no access, isolate, and no recommendation states.

Policy Decision Component 130

Consistent with an implementation described herein, policy decision component 130 may be configured to combine policy results for an endpoint from multiple evaluation modules 320 to obtain a combined policy result. The combined policy result may be a Boolean result while the individual policy results from evaluation modules 320 may be multi-state (i.e., tri-state or greater) values. The combined policy result may be directly used by policy enforcement component 140 to control resource access for an endpoint or the combined policy result may be used to influence a higher level policy decision.

Figure 4:
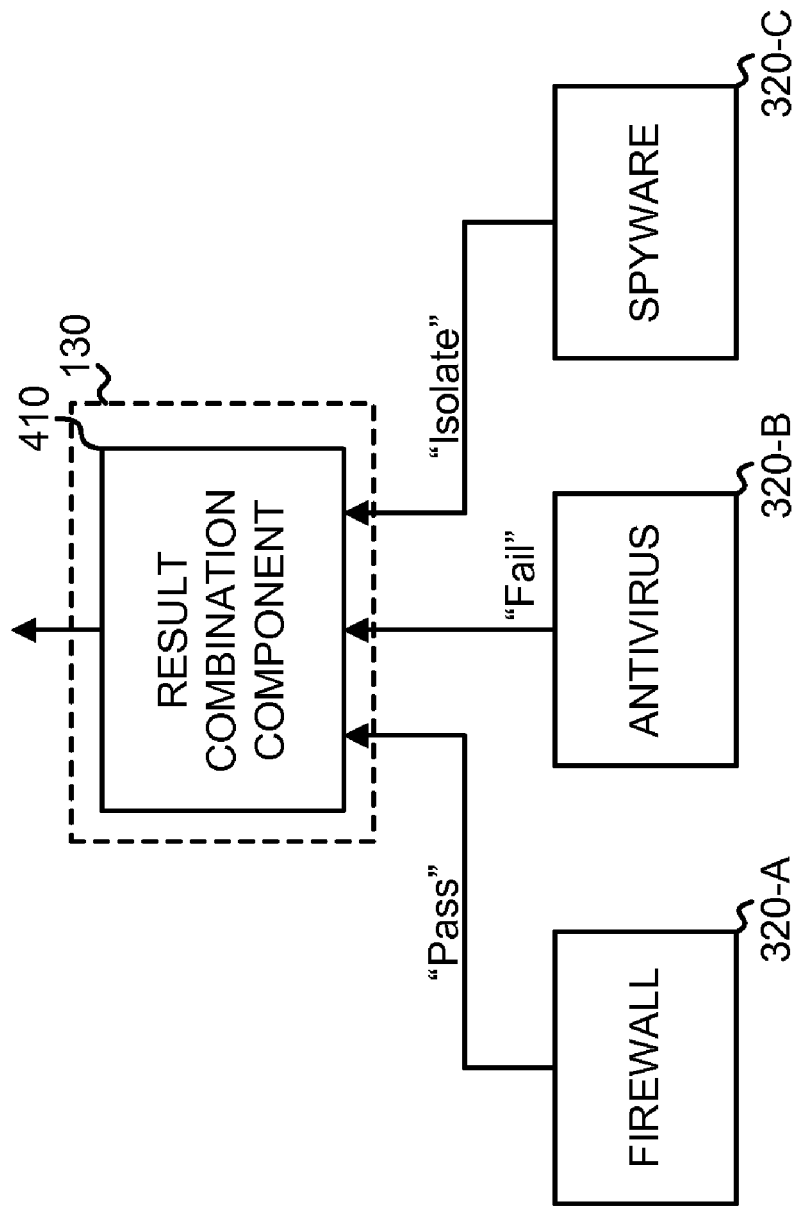
FIG. 4 is a diagram conceptually illustrating the operation of a policy decision component in combining policy results for an endpoint from multiple evaluation modules.

FIG. 4 is a diagram conceptually illustrating the operation of policy decision component 130 in combining policy results for an endpoint from multiple evaluation modules 320. In this example, assume that evaluation module 320-A ("firewall") outputs an indication of whether an approved firewall is active at the endpoint, evaluation module 320-B ("antivirus") outputs an indication of whether approved anti-virus software is active at the endpoint, and evaluation module 320-C ("spyware") outputs an indication of whether approved anti-spyware software is active at the endpoint. Further, assume that each module outputs a tri-state policy result that includes one of the three states: pass, fail, and isolate. Pass may indicate that the endpoint satisfied the policy, fail may indicate that the endpoint did not satisfy the policy, and isolate may indicate that the endpoint did not satisfy the policy but that remediation is possible.

As shown in FIG. 4, policy decision component 130 may include result combination component 410. Result combination component 410 may operate to combine the multi-state policy results from evaluation modules 320-A, 320-B, and 320-C to obtain a single Boolean (i.e., two state) output policy result, indicated in FIG. 4 as a "pass" result or a "fail" result. Result combination component 410 may combine the input policy results based on predefined criteria, such as criteria predefined by an administrator of policy decision component 130.

The criteria predefined by the administrator may be a custom Boolean expression in which the set of possible operands includes each state from each evaluation module. Evaluation module 320-A (firewall), for example, includes three possible operands: firewall.pass, which may take the value true or false; firewall.fail, which may take the value true or false; and firewall.isolate, which may take the value true or false. As an example of a predefined criterion on which result combination component 410 may operate to obtain a single Boolean policy result, consider the following criterion:

(antivirus.pass OR antivirus.isolate) AND (spyware.pass or spyware.isolate); where "antivirus" refers to evaluation module 320-B and "spyware" refers to evaluation module 320-C. This criterion would evaluate to true (pass) when evaluation module 320-B (antivirus) and evaluation module 320-C (spyware) both return either a "pass" or "isolate" policy result. Another, alternate expression, for this this criterion is:
!antivirus.fail AND !spyware.fail,
where "!" represents the NOT operator.

Exemplary Processing

Figure 5:
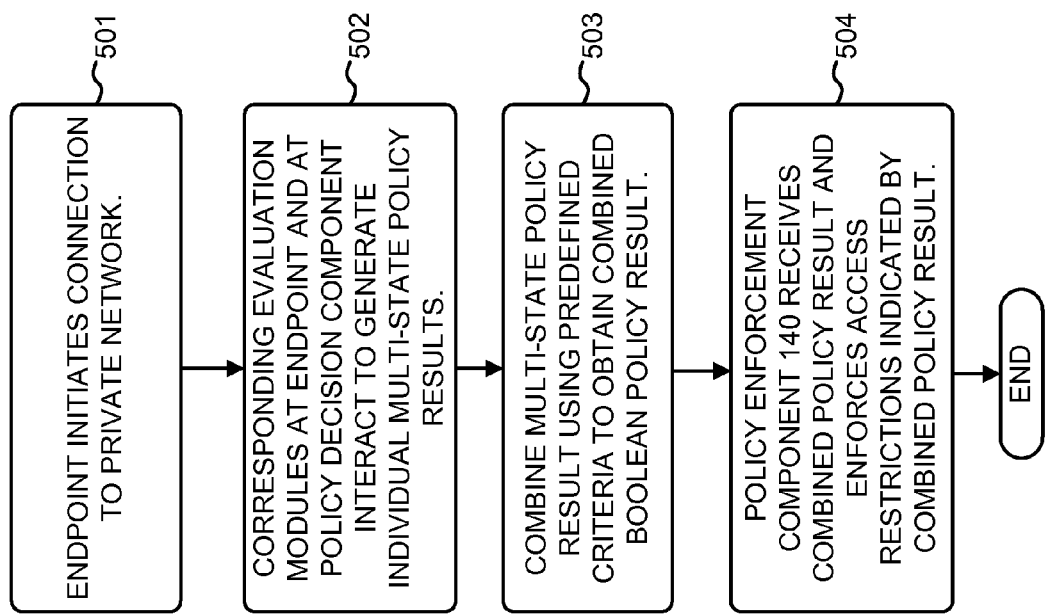
FIG. 5 is a flowchart of exemplary operations of an endpoint integrity system.

FIG. 5 is a flowchart of an exemplary operation of endpoint integrity system 145.

An endpoint may initiate a connection to protected network 180 (act 501). For example, a remote user may wish to connect to resources 150 of protected network 180 to access email or files. The remote user may connect to protected network 180 over open network 170 and through gateway network device 120. Alternatively, a user initially connecting within protected network 180, such as client 110-B, may initiate the connection.

As previously mentioned, the connecting endpoint may be associated with a number of evaluation modules, such as evaluation modules 310, that each correspond to an associated evaluation module 320 at policy decision component 130. These evaluation modules may interact with one another to generate individual multi-state policy results (act 502). These individual multi-state policy results may each be capable of taking three or more states.

The individual multi-state policy results may then be combined to generate a combined policy result (act 503). The combined policy result may be a Boolean value. In other words, the combined policy result may be capable of assuming two possible values, such as true/false or pass/fail. Result combination component 410 may generate the combined policy result using criteria predefined by an administrator. As discussed above, the predefined criteria may be a custom Boolean expression in which the set of possible operands includes each state from each evaluation module.

The combined policy result may then be transmitted to policy enforcement component 140, which enforces access restrictions to resources 150, as indicated by the combined policy result (act 504). For example, policy enforcement component 140 may allow the user to access an email account but determine that the user is to have limited or no access to a file server of protected network 180.

In some implementations, policy enforcement component 140 may receive a number of different combined policy results from policy decision component 130. Policy enforcement component 140 may then enforce different access restrictions based on the different combined policy results. For example, an administrator may specify that policy results from evaluation modules 320-A and 320-B are combined using first predefined criteria to produce a first combined policy result while policy results from evaluation modules 320-B and 320-C are combined using second predefined criteria to produce a second combined policy result. Each of the first and second combined policy results may relate to different access restrictions. In other possible implementations, multiple ones of the combined policy results may be further combined to obtain a higher level policy result.

Figure 6:
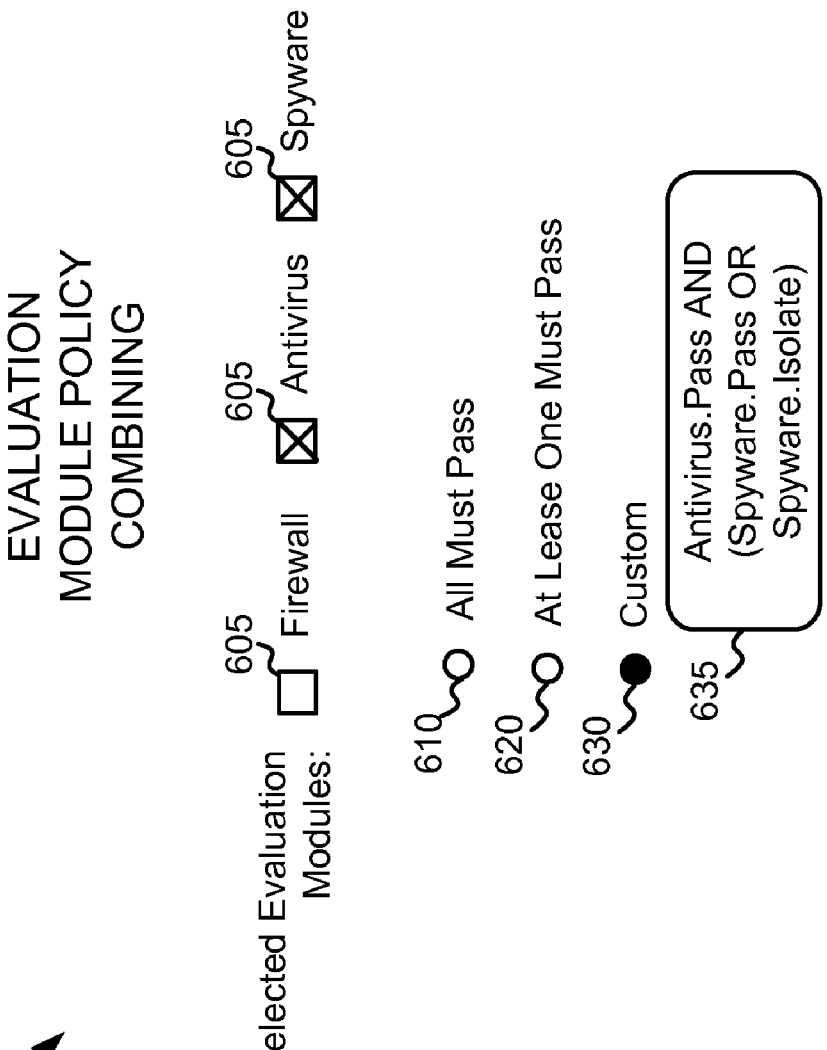
FIG. 6 is a diagram of an exemplary interface presented by a network device for configuring criteria relating to how policy results are to be combined.

FIG. 6 is a diagram illustrating an exemplary interface presented by a network device, such as policy decision component 130, for configuring criteria relating to how policy results from evaluation modules 320 are to be combined. In this example, assume that the administrator has logged into policy decision component 130 using a web browser via an HTTP connection. The network device may present an interface 600 through which the administrator can configure the network device. In the example interface 600, checkboxes 605 are used to allow the administrator to select which of the available evaluation modules the administrator would like to include in the policy. In this example, the evaluation modules named "antivirus" and "spyware" are selected. Selection buttons 610, 620, and 630 may be used to configure how the results from the selected evaluation modules are to be combined. When button 610, "all must pass," is selected, the policy is set so that all of the selected evaluation modules must produce a pass result for the policy result to be true (e.g., pass). When button 620, "at least one must pass," is selected, the policy is set so that at least one of the selected evaluation modules must produce a pass result for the policy result to be true (e.g., pass). When button 630, "custom," is selected, the policy result is based on predefined criteria that may be entered by the administrator in box 635. The predefined criteria, as discussed above, may be a expression in which the set of possible operands includes each state from each selected evaluation module. In this example, the administrator has entered "antivirus.pass AND (spyware.pass OR spyware.isolate)," which will produce a pass policy result when the "antivirus" evaluation module produces a pass result and the "spyware" evaluation module does not produces a "pass" or "isolate" result. One of ordinary skill in the art will recognize that the specific syntax used to represent the predefined criteria is not critical. For example, another equivalent implementation of the above expression may be written as: "antivirus==pass AND (spyware==pass OR spyware==isolate)."

CONCLUSION

Implementations consistent with the principles of the invention, as described above, relate to techniques through which multi-state (three or more state) policy results can be combined to produce a two-state (Boolean) policy result.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 5, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
a plurality of evaluation modules to:
receive information associated with an endpoint device, and
generate, based on the information, respective policy results for the endpoint device, where each of the respective policy results is selected from a group of three or more states that include:
a pass state,
a fail state, and
a third state that differs from the pass state and the fail state;
a result combination component to:
receive, from the plurality of evaluation modules, the respective policy results, and
combine, based on a custom criterion, the respective policy results, from the plurality of evaluation modules, to produce a combined Boolean policy result; and
a processor to evaluate the endpoint device based on the combined Boolean policy result.

2. The network device of claim 1, where the custom criterion includes a Boolean expression in which a set of possible operands for the expression include each of the three or more states.

3. The network device of claim 1, where the third state includes:
an isolate state, or
a no recommendation state.

4. The network device of claim 1, where the policy results relate to an integrity status of the endpoint device.

5. The network device of claim 1, where the policy results relate to at least one of:
an identity of a user of the endpoint device, or
an identity of the endpoint device.

6. The network device of claim 1, where the plurality of evaluation modules include:
a particular evaluation module to confirm a presence of at least one of security-related hardware or security-related software associated with the endpoint device.

7. The network device of claim 6, where the security-related hardware includes a firewall, and
where the security-related software includes:
antivirus software, or
anti-spyware software.

8. The network device of claim 1, where the processor further includes:
a policy enforcement component to control access to network resources for the endpoint device based on the combined Boolean policy result.

9. A method comprising:
receiving a request, by a network device, from an endpoint device, to initiate a connection;
obtaining, by the network device, a plurality of policy results relating to a security state of the endpoint device, where each of the plurality of policy results is selected from a group of three or more states that include:

a pass state,
a fail state, and
a third state that differs from the pass state and the fail state;
combining, by the network device, the plurality of policy results to obtain a Boolean policy result based on a criterion associated with an expression that includes a set of respective possible operands the three or more states, where the criterion includes at least two different Boolean operators; and
determining, by the network device and based on the Boolean policy result, whether to establish the connection requested by the endpoint device.

10. The method of claim 9, further comprising:
restricting access, by the endpoint device, to resources based on the Boolean policy result.

11. The method of claim 9, where the at least two different Boolean operators, for the expression, include at least one of AND, OR, or NOT operators.

12. The method of claim 9, where obtaining the plurality of policy results includes:
exchanging information between a plurality of corresponding client-side and server-side evaluation modules to obtain the plurality of policy results.

13. The method of claim 9, where the plurality of policy results relate to an integrity status of the endpoint device.

14. The method of claim 9, where the plurality of policy results relate to at least one of:
an identity of a user of the endpoint device, or
an identity of the endpoint device.

15. The method of claim 9, where the plurality of policy results relate to confirming a presence of at least one of security-related hardware or security-related software associated with the endpoint device.

16. A system comprising:
a non-transitory memory to store computer-executable instructions; and
one or more processors to execute the computer-executable instructions to:
obtain a plurality of policy results associated with an endpoint device, where each of the plurality of policy results is selected from a group of three or more states that include:
a pass state,
a fail state, and
a third state that is different from the pass state and the fail state;
obtain, based on the plurality of policy results, a Boolean policy result;
control, based on the Boolean policy result, access between the endpoint device and a protected network; and
determine based on the Boolean policy result, whether to grant access, by the endpoint device, to resources of the protected network.

17. The system of claim 16, where the one or more processors, when obtaining the Boolean policy result, are further to:
obtain the Boolean policy result based on a criterion associated with an expression that includes respective possible operands for the three or more states.

18. The system of claim 17, where the criterion includes a custom criterion specified by an administrator.

19. The system of claim 18, where the one or more processors are further to:
provide, for presentation to the administrator, an interface to receive, from the administrator, the custom criterion.

20. The system of claim 16, where the third state includes at least one of an isolate state or a no recommendation state.

21. The system of claim 17, where the plurality of policy results relate to an integrity status of the endpoint device.

22. The system of claim 17, where the plurality of policy results relate to confirming a presence of at least one of security-related hardware or security-related software associated with the endpoint device.

23. A system comprising:
one or more devices to:
receive a request to initiate a connection from an endpoint device;
interact with the endpoint device to obtain a plurality of policy results relating to a security state of the endpoint device, each of the plurality of policy results being selected from a group of three or more possible states that include:
a pass state,
a fail state, and
one or more third states that differs from the pass state and the fail state;
combine the plurality of policy results to obtain a Boolean policy result based on a criterion, where the criterion is associated with an expression that includes respective possible operands for the three or more possible states; and
determine, based on the Boolean policy result, whether to establish the connection requested by the endpoint device.

24. The network device of claim 1, where the criterion is a first custom criterion received from an administrator, where the Boolean policy result is a first Boolean policy result, where the network device further includes:
a criterion generation component to receive a different second custom criterion from the administrator,
where the result combination component is further to combine, based on the second custom criterion, the generated policy results from the evaluation modules to produce a different second Boolean policy result.

25. The method of claim 9, where the plurality of policy results includes first policy results and second policy results, and
where obtaining the plurality of policy results includes:
receiving information from the endpoint device;
processing the information to form the first policy results; and
receiving, from a device that differs from the network device, the second policy results.

26. The system of claim 16, where the one or more processors, when obtaining the plurality of policy results, are further to:
obtain a Boolean policy result by combining the plurality of policy results with additional policy results received from another device that differs from the endpoint device.

27. The system of claim 23 where the criterion is a first custom criterion received from an administrator,
where the Boolean policy result is a first Boolean policy result, and
where the one or more devices are further to:
receive a different second custom criterion from the administrator,
combine, based on the second custom criterion, the generated policy results from the evaluation modules to produce a second Boolean policy result that differs from the first Boolean policy result.

* * * * *

UNITED STATES PATENT AND TRADEMARK OFFICE
CERTIFICATE OF CORRECTION

| | | |
|---|---|---|
| PATENT NO. | : 8,369,224 B1 | |
| APPLICATION NO. | : 11/530189 | |
| DATED | : February 5, 2013 | |
| INVENTOR(S) | : Roger Chickering et al. | |

It is certified that error appears in the above-identified patent and that said Letters Patent is hereby corrected as shown below:

Title page, item (75) please correct the 4th inventor's name to "Panagiotis Kougiouris" in the list of inventors.

In the Claims:

Column 8, line 29 (claim 1), correct as follows:
after "result" replace ";" with ","

Column 9, line 8 (claim 9), correct as follows:
after "operands" insert --for--

Column 10, line 23 (claim 23), correct as follows:
after "states" replace ";" with ","

Signed and Sealed this
Sixteenth Day of April, 2013

Teresa Stanek Rea
*Acting Director of the United States Patent and Trademark Office*